United States Patent [19]

Luttmer

[11] Patent Number: 5,726,760
[45] Date of Patent: Mar. 10, 1998

[54] METHOD AND APPARATUS FOR CONVERTING IMAGE REPRESENTATION FORMATS AS WELL AS AN IMAGE PRODUCTION SYSTEM PROVIDED WITH SUCH AN APPARATUS

[75] Inventor: Maurice L. M. Luttmer, Venlo, Netherlands

[73] Assignee: Oce-Nederland, B.V., Ma Venlo, Netherlands

[21] Appl. No.: 627,110

[22] Filed: Apr. 3, 1996

[51] Int. Cl.$^6$ .................................................. H04N 1/40
[52] U.S. Cl. ...................... 358/298; 358/447; 358/261.1
[58] Field of Search ........................... 358/298, 443, 358/447, 448, 455–466, 426, 427, 261.1–261.4; 382/232, 237, 245, 246

[56] References Cited

U.S. PATENT DOCUMENTS

| | | | |
|---|---|---|---|
| 4,542,413 | 9/1985 | Rallapalli et al. | 358/261.4 |
| 5,040,073 | 8/1991 | Renelt et al. | 358/261.1 |
| 5,552,832 | 9/1996 | Astle | 382/245 |

FOREIGN PATENT DOCUMENTS 0597571  5/1994  European Pat. Off. ........ G06F 15/72

*Primary Examiner*—Eric Frahm

[57] ABSTRACT

A method and apparatus that convert a series of drawing instructions, suitable for assigning pixel values corresponding to the drawing instructions to an image arranged in rows and columns of pixels, to a series of runlengths and corresponding pixel values. A runlength represents the number of successive pixels with mutual identical pixel values while the series of runlengths and pixel values is arranged according to a first order as determined by successive pixel positions. The runlengths of the pixel values (as generated by the drawing instructions) are determined in a second order which is different from the first order. Consequently, the insert positions of these runlengths are determined on the basis of pixel positions which correspond with said determined runlengths. On the basis of these insert positions, the determined runlengths are inserted in the series of runlengths so that runlengths in the series (which have positions in common with the runlengths to be inserted) are modified in dependance on the runlengths and pixel values to be inserted.

15 Claims, 15 Drawing Sheets

BLEN: 4, 8, 16......, 256 32 BITS WORDS

LEN1 + ....... LEN7 = 256

METHOD AND APPARATUS FOR CONVERTING IMAGE REPRESENTATION FORMATS AS WELL AS AN IMAGE PRODUCTION SYSTEM PROVIDED WITH SUCH AN APPARATUS

FIELD OF THE INVENTION

The invention is related to a method for converting a series of drawing instructions, suitable for assigning pixel values (corresponding to said drawing instructions) to pixels positioned in an image arranged in rows and columns of pixels, to a series of runlengths and corresponding pixel values whereby a runlength represents the number of successive pixels with mutual identical pixel values and the series of runlengths and pixel values is arranged according to a first order as determined by successive pixel positions.

The invention is also related to an apparatus for converting image representation formats, comprising input means for receiving drawing signals which are suitable for generating in accordance herewith pixel value signals of pixels of an image arranged in columns and rows of pixels, runlength generation means for generating runlength signals in accordance with said drawing signals to be fed hereto whereby a runlength signal represents the number of successive pixels with mutual identical pixel value signals, memory means for storing the runlength signals and corresponding pixel value signals generated by the runlength generation means, whereby the runlength signals are readable from the memory means in a first order as determined by successive pixels positions.

BACKGROUND OF THE INVENTION

The European patent application EP 0 597 571 A2 discloses a way in which image information consisting of symbolic drawing instructions, such as for example ASCII-codes for characters or vector instructions for drawing a line, are processed in order to be reproduced by a printer.

Such image information can originate from, for example, a text processor or a graphic editing system. The image format with symbolic drawing instructions delivered hereby is mostly defined according to a standardized Page Description Language such as, for example, Post Script (@Adobe). However, a raster oriented printer is expecting image information in a rasterized format such as a bitmap. The image is hereby arranged in columns and rows of pixels where print information is given for each pixel. This print information may consist of one bit which, dependent on the value, indicates a maximal or minimal optical density of a pixel.

Such image information may be used to control a printer directly. The print information may also consist of several bits which indicate the grey value of a pixel, for example, 8 bits for defining 256 grey values. In the case of color information expressed in the three elementary colors red, green and blue, the print information may consist of 3×8=24 bits. A bitmap with grey value information for each pixel is also described as a continuous tone bitmap. Although a printer can not be controlled directly herewith, the advantage of a continuous tone bitmap is that a printer may use its own halftone algorithm, tuned to the engine, for converting multi-value grey value information into two value or binary information.

The usual methods and apparatuses for converting a Page Description Language to a bitmap employ a memory for storing the pixel information generated by the separate drawing instructions. Such a conversion, also called rasterization, is executed by a special apparatus such as a raster image processor. A drawing instruction, such as for example an instruction to draw a special character at a special position, is hereby fed to a character generator. This character generator then generates pixel values (consisting of one or more bits) for the pixels concerned and which values are consequently stored in a bitmap memory. This is repeated for all drawing instructions until the complete bitmap is defined. It is important hereby to recognize that the generation of pixel values is a non-serial process. A drawing instruction may afterwards, for example, substitute pixel values of previous drawing instructions. In other words, all pixels of a bitmap have their final value only when the last drawing instruction has been processed.

A raster image processor therefore has to be capable, in principle, to store a complete bitmap.

The present printers and digital copying systems may have a reproduction resolution of 400 DPI (dots per inch) which results, for 24 bits for each pixel, in approximately 48 MB required memory space for an A4 size image.

A 48 MB memory space leads to a substantial increase in cost price for a raster image processor. In the case of transmitting afterward the bitmap stored in a memory to a printer or a digital copying apparatus, the necessary demands are required of the means for transmitting the pixel values. If this transmission performed with a standard data exchange protocol, such as for example with a SCSI (Small Computer System Interface) connection, the transmission will require the necessary time. For a fast transmission, a special, i.e., a more expensive, connection is required. The patent mentioned heretofore discloses how to reduce the required amount of memory to a minimum. The drawing instructions are reduced hereto to a series of simpler drawing instructions which are preferably active only on pixels within a special band of the image. Information can, owing to this, be bandwise transmitted to a connected printer.

According to the mentioned patent, the image raster information is further compressed according to a known compression algorithm such as, for example, runlength compression, LZW compression or JPEG compression. The final bitmap, or a part therefrom, is converted to a compressed format. With runlength compression, this leads to a series of runlengths to be read in a given order. This series of runlengths defines pixel values of successive pixels arranged according to successive pixel positions. For example, pixels are arranged within a horizontal image line from left to right and further, by each image line, from top to down.

In particular, according to the mentioned patent a compression algorithm is chosen which is optimal for the information content of the image.

However, despite dividing the bitmap into bands to be filled separately and despite compression of the bitmap data, still a considerable amount of memory is required. For compression to be started, at least a part of the bitmap should be known.

Of course, it is in principle possible to suffice with a memory with a size of, for example, one image line. However, all drawing instructions should be then processed for each image line again and again. It is clear that this will lead to a substantial processing time in constituting a complete bitmap. Further, the compression adds additional processing time thereby further delaying the processing of a received image. With an expected increase of resolution of an image reproduction system, the delay caused by compression will further increase.

SUMMARY OF THE INVENTION

The method according to the invention has as its object to overcome the mentioned disadvantages and is thereto characterized by determining the runlengths of the pixel values, as generated by the drawing instructions, in a second order which is different from the first order, determining the insert positions of said determined runlengths in the series of runlengths on the basis of pixel positions of said determined runlengths, inserting said determined runlengths in the series of runlengths such that runlengths of the series which have positions in common with the runlengths to be inserted are modified in dependance on the runlengths and pixel values to be inserted.

The apparatus according the invention is characterized in that the apparatus comprises runlength inserting means suitable for storing the generated runlength signals into the memory means such that runlength signals are fed to the runlength generation means in a second order which is different from the first order and whereby the runlength, signals already stored into the memory means and which have coinciding pixel positions with said generated runlength signals, are modified in dependance on the generated runlength signals and pixel value signals.

Instead of first storing the pixel values in a memory as a bitmap and compressing these pixel values after all drawing instructions have been processed, the pixel values are now written immediately after each drawing instruction to a compressed runlength format. As mentioned before, the drawing instructions having a first order are used to generate pixel values and, thus, corresponding runlengths in a second order determined by the first order where said second order is different from the first order. For example, a character will not define a complete horizontal row of successive pixels but only a number of local pixels distributed over a number of image lines. The sequence of reading successive pixels of one complete image line differs from the sequence of pixels generated by a character drawing instruction.

A runlength to be inserted is therefore fitted in the series of runlengths already generated and which are ordered in a first order corresponding to successive pixel position, thereby modifying the runlengths in the series if necessary. By fitting a runlength to be inserted direct into the series of runlengths, an intermediate storage of pixel values is not required therefore. The choice of runlength compression is based on the insight that the pixel values, generated by a drawing instruction, mostly correspond with a number of successive pixels at an image line. For example, a character will cover several successive pixels on an image line.

By directly expressing generated identical pixels values from a number of successive pixels into runlengths according to a known runlength compression method and fitting these runlengths in the already generated series of runlengths, the use of memory is limited to a minimum and processing time is saved.

A further embodiment of the method is characterized in that the step of inserting comprises removing runlengths from the series (which are overlapped completely by the runlength to be inserted with respect to pixel position, shortening runlengths from the series which are overlapped partially by the runlength to be inserted with respect to pixel position and which have different pixel values) with a length equal to the part overlapped, lengthening the runlength to be inserted in the case of runlengths of the series which are overlapped partially by the runlength to be inserted (with respect to pixel position) and which have an identical pixel value with a length equal to the part not overlapped followed by removing said runlength for the series, and inserting the runlength to be inserted into the series of runlengths.

In case of overlap of a new runlength to be inserted with previously generated runlengths, it is determined if one or more existing runlengths have to be shortened, removed or combined with the new runlength to be inserted.

An advantageous embodiment of the method is being characterized by dividing the image in subareas of pixels, dividing the series of runlengths and pixel values in subseries whereby each subseries corresponds with a subarea of the image and further inserting the runlengths and pixel values into the subseries which are corresponding with the subareas of said runlengths.

Inserting a new runlength in the subseries is easier and faster because the number of runlengths in a subseries is restricted, especially if addressing of a subseries is also fast as in the case of a subseries which corresponds with an image line or a part of an image line. It is true that some additional administration is needed for a subseries to which a new runlength has to be added. However, because the runlengths originating from one drawing instruction in practice occur in the same subarea, a gain in processing time is achieved.

In an embodiment of the method characterized by storing the subseries in an addressable memory, assigning an information word to each subarea, and adding address information to the information word concerning the address of the corresponding subseries in the memory, a flexible addressing of a subseries of runlength is achieved. Storage in another memory area can easily be realized by adapting the address information in the information word.

Herewith an efficient memory management is obtained by making available in the first instance a minimal amount of memory space in the addressable memory for each subseries, further determining if there is sufficient memory space available for each runlength and pixel value to be inserted for the corresponding subseries, enlarging the memory space available for the subseries if needed and adapting the address information in the corresponding information word.

In case that a subarea exists of only one color, such as for example in case of a white background, a pixel value corresponding with a runlength does not need to be represented by 24 bits but only 1 bit. A further advantageous method is then obtained in which type information is added to the information word for indicating the type of information which is represented by the corresponding sub series. The type information may be used to indicate the presence of only one color.

A fast method for searching the insert position of a runlength is characterized by splitting a subseries up into two parts such that the available space in the memory for a subseries is positioned between the spaces occupied by the two parts and such that the runlength and pixel value inserted latest occupies the space adjacent to the available space, moving through the runlengths from this available space when searching for a runlength in the subseries, and moving (after inserting a runlength to the subseries), the runlengths until the inserted runlength is adjacent to the available space. Because a runlength to be inserted is often adjacent to a previously inserted runlength, it is advantageous to make the available space adjacent to the runlength inserted latest. Removing of runlengths in order to make space for a new runlength, can then be avoided.

BRIEF DESCRIPTION OF THE DRAWINGS

The method and apparatus according to the invention shall be illustrated by referring to the following figures, where

FIGS. 5-9 are illustrating the inserting of a short runlength which fits within one strip buffer and FIGS. 10-12 are illustrating the inserting of a long runlength which covers several strip buffers; where FIG. 6 illustrates the method for determining if a short runlength is situated either only to left, only to right or to the left as well as to the right of the available memory space in a strip buffer;

FIG. 7 illustrates the method for inserting a short runlength if it covers the left as well as the right end of the available memory space in a strip buffer;

FIG. 8 illustrates the method for inserting a short runlength if it covers only the right end of the available memory space in a strip buffer;

FIG. 9 illustrates the method for inserting a short runlength if it covers only the left end of the available memory space in a strip buffer, and FIG. 10, as split into

FIG. 11 illustrates the method for inserting the right end of a long runlength in strip buffer to be filled partially;

FIG. 12, as split into

DETAILED DESCRIPTION OF THE PREFERRED EMBODIMENTS

In an embodiment of the method according to the invention, the image (arranged in columns and rows of pixels), is divided into sub areas, hereafter called strips. Inserting of runlengths can take place per strip. The advantage off this is that, per strip, only a limited number of runlengths have to be searched and eventually be moved.

Figure 1:
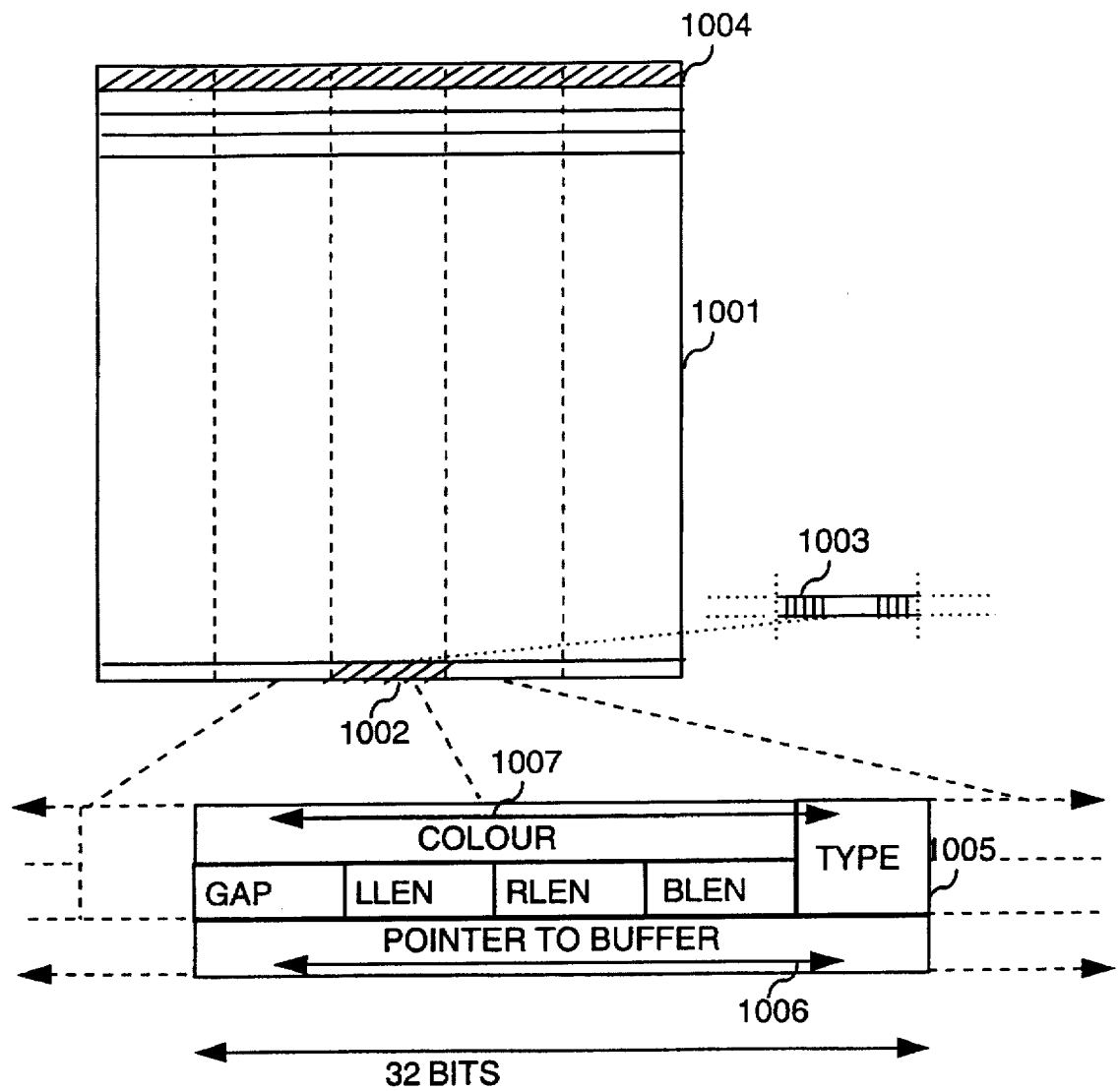
FIG. 1 illustrates schematically a division of an image in strips with corresponding information words.

In FIG. 1, it is schematically shown in which way an image 1001 is divided in strips 1002 of each 256 pixels 1003. Each horizontal image line 1004 is further divided in 20 strips 1002. Per strip 1002, an information word 1005 is defined in which the memory addresses of the allocated memory space for the strip are included. The allocated memory space for a strip is called hereafter a strip buffer. The size of a strip buffer can easily be adapted by modifying these memory addresses.

A series of 32 bits in an address pointer part 1006 is allocated for the start address of a strip buffer. This address pointer part is called hereafter POINTER. A second series 1007 of 32 bits is allocated for additional information relating to the strip buffer. Bits 0 and 1 therefrom (TYPE) denote if a strip buffer represents one pixel value (MONO-COLOR or several pixel values (FULL-COLOR). In case of MONO-COLOR the pixel value is not stored in the strip buffer itself but in the highest order 24 bits (9-31) (COLOR) of the information word. In this case a strip buffer for storing the length is not required as the runlength with this pixel value is, by definition, equal to the maximum size of a strip (256 pixels). Only in this case the fields described hereafter are not applicable.

The bits 2-31 are defined differently in case of FULL-COLOR. The bits 2-4 (BLEN) then denote the size of the strip buffer. Standard sizes are 4, 8, 16, 32, 128 or 256 bits words. These sizes are coded as 0 up and until 6 respectively.

The runlengths stored are situated in the strip buffer in such a way that the runlength inserted latest is adjacent to the still available memory space. This available memory space is denoted as gap and separates the runlengths stored in a left and a right part. The advantage is that inserting a new runlength can be done faster in most cases. A new runlength will often be adjacent to a previously inserted runlength. The extra time necessary for moving the runlengths in the memory when once a runlength can not be inserted adjacent the gap, does not cancel the obtained gain in time in case of insertions directly in the gap. The bits 5-13 (RLEN) represent the number of runlengths to the right (0-256) and the bits 14-22 (LLEN) represent the number of runlengths to the left of the gap. The pixel position (GAP) is represented by the bits 23-31 (pixel 0 up and until pixel 255). This is thus the pixel coordinate within the strip at the end of the runlength left to the gap (and at the start of the runlength right to the gap).

Figure 2:
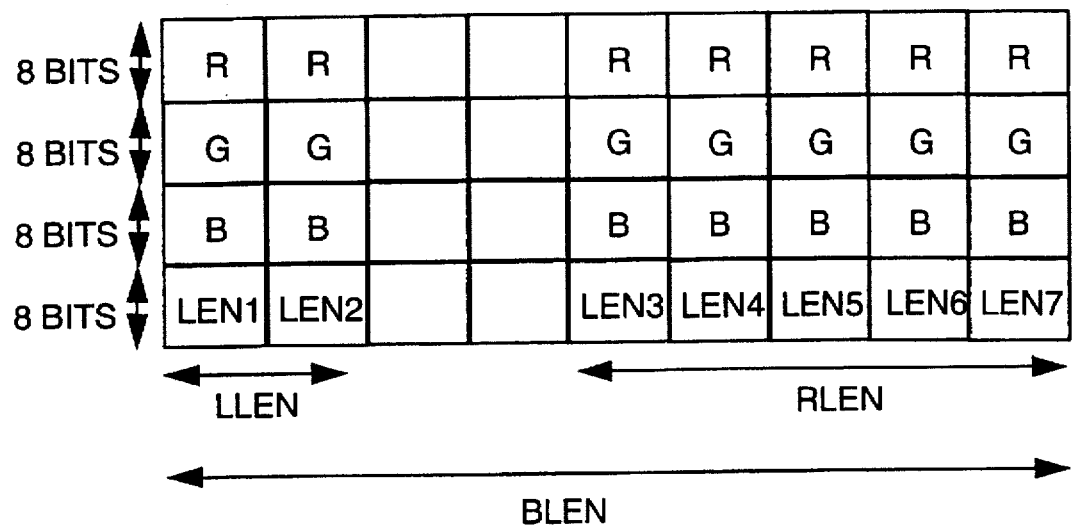
FIG. 2 gives an example of a subseries of runlengths belonging to a strip.

In FIG. 2 an example is given of a strip buffer. A runlength (LEN1, LEN2 . . . ) is coded with 8 bits (with possible lengths of 1 up and until 256) and the corresponding pixel value with 24 bits (8 bits for red (R), 8 bits for green (G) and 8 bits for blue (B)). Thus, 256 grey values are available for each elementary color. As is well known, an arbitrary color can be defined by a specific combination of values of these three elementary colors R, G and B (or by another set of elementary colors such as for example cyan, magenta or yellow). In case of this example the number of runlengths to the left (LLEN) of the gap amounts to 2 and the number of runlengths to the right (RLEN) of the gap amounts to 5. The runlength denoted with LEN2 is inserted latest while the pixel position of the end of this runlength is stored as GAP in the bits 23-31 in the information word illustrated in FIG. 1.

Figure 3:
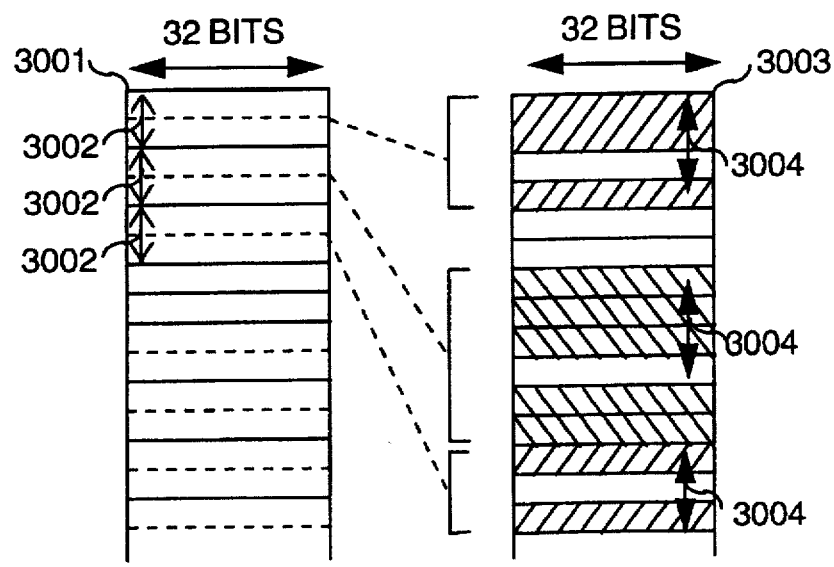
FIG. 3 illustrates the relation between a series of information words and the corresponding subseries of runlengths stored in strip buffers.

FIG. 3 finally illustrates schematically a possible arrangement of a memory into a part 3001 with information words 3002 of each two times 32 bits and a part 3003 with strip buffers of several 32 bits words. This strip buffer memory 3003 is constituted of a sequence of strip buffers 3004 of different sizes. Each information word 3002 points to a strip buffer 3004.

Figure 4:
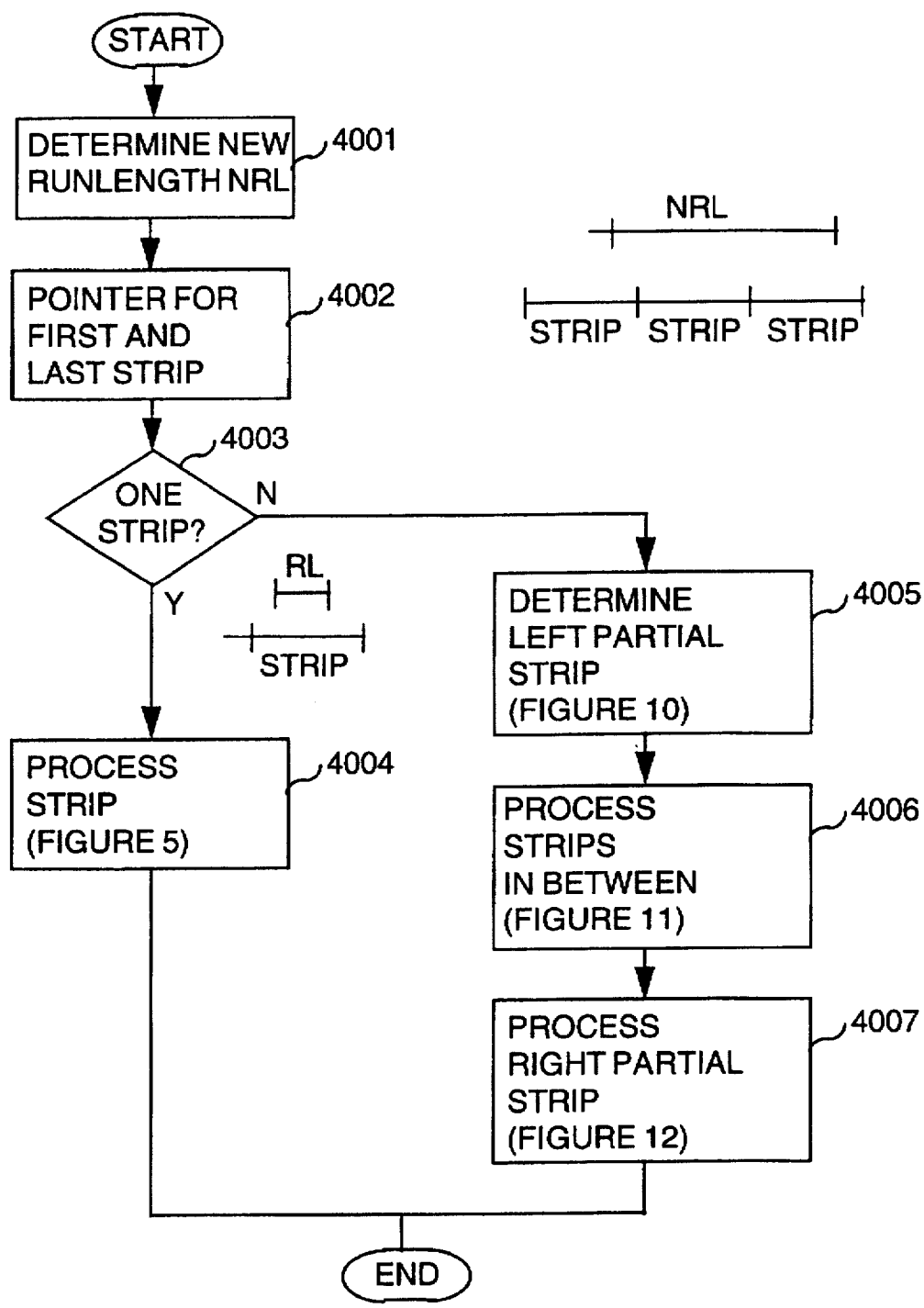
FIG. 4 gives a flow chart of the method according to the invention for inserting a new runlength in one or more strip buffers, where
Figure 5:
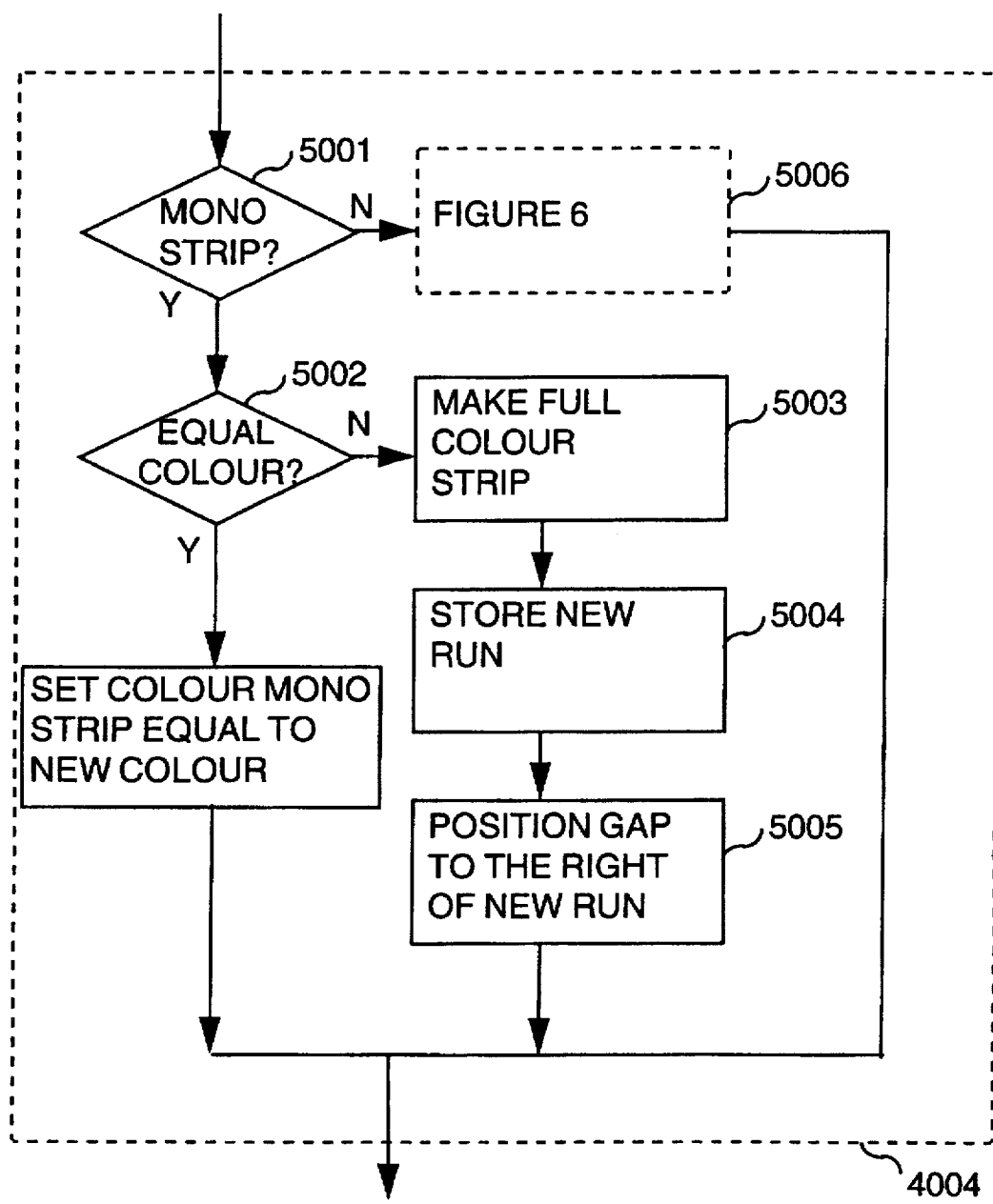
Figure 10A:
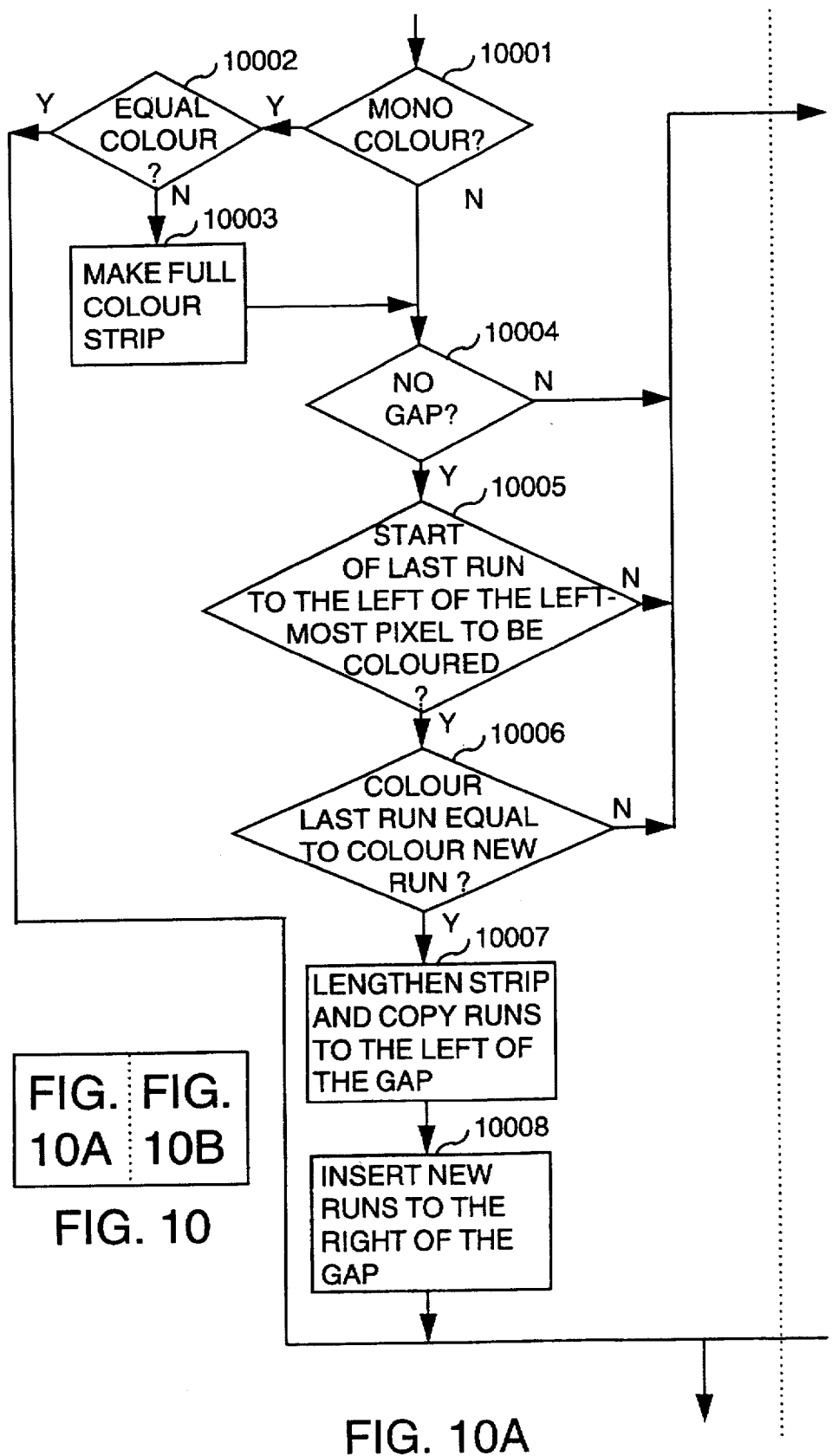
FIGS. 10A and 10B, illustrates the method for inserting the left end of a long runlength in a strip buffer to be filled partially.
Figure 10B:
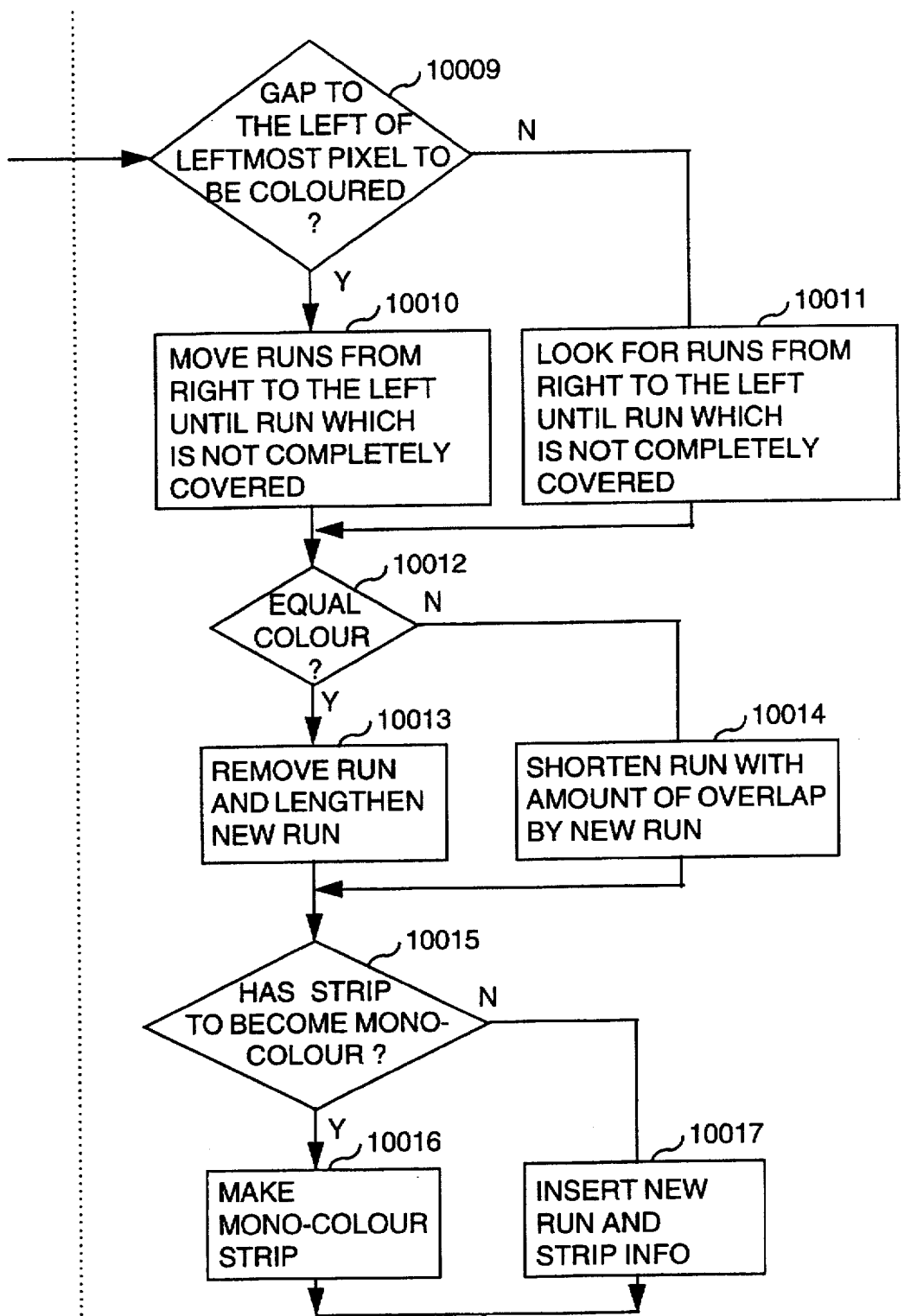

FIG. 4 illustrates a method for inserting new runlengths NRL in one or more strip buffers. Generation of these runlengths on the basis of drawing instructions of a page description language, as for example PostScript (@Adobe), will be not described further. Such a generation is well known to a skilled man in the art. In practice, for example, an ASCIIcode for a character is fed to a symbol generator for generating one or more pixel values of successive pixels. Another possibility is converting relative complex drawing instructions to less complex drawing instructions which also can be used to generate a series of pixel values. The series of pixels generated in this way, are represented, in step 4001, by a new runlength NRL to be inserted. It is hereby remarked that, for convenience, with runlength not only the number of successive pixels with identical pixel values (values hereafter to be called color) is meant but also the corresponding pixel value or color. The POINTERS for the first and last strip which are possibly to be modified by the new runlength NRL, are determined at step 4002. Pointers are addressable more efficiently then the individual pixels addresses as the pointers can be arranged as a fast addressable matrix covering the entire image. In decision step 4003, a distinction is made between the case that the new runlength NRL merely covers one strip (step 4004) and the case the new runlength NRL covers several strips (step 4005, 4006 and 4007). The processing of one strip according to step 4004 is illustrated in FIG. 5 while the processing of several strips is illustrated in FIG. 10 (leftmost strip to be filled or colored partially), FIG. 11 (strips situated between and to be filled or colored completely) and FIG. 12 (rightmost strip to be filled or colored partially). The method illustrated in FIG. 4 is repeated until all the generated pixel values are stored as a series of runlengths in the corresponding strip buffers.

FIG. 5 illustrates a further embodiment of step 4004 of FIG. 4 related to inserting a new runlength in only one strip buffer. First it is determined, in step 5001, if the strip buffer belongs to the MONO-COLOR type. When this is this the case and when also is established, in step 5002, that the color of the new runlength is identical to the color of the MONO-COLOR strip buffer, the strip buffer need not to be changed. The processing so far as the new runlength is completed then.

However if, in step 5002, it is established that the color of the new runlength NRL is different from the MONO-COLOR color, the strip buffer has to be changed into a FULL-COLOR strip buffer. Hereby, in step 5003, memory space has to be allocated and the previously described TYPE-information has to be changed correspondingly. The runlength of the new runlength is, in step 5004, subsequently stored in the strip buffer where further, in step 5005, it is determined whether the available memory space (or gap) is situated to the right of the inserted runlength.

Figure 6:
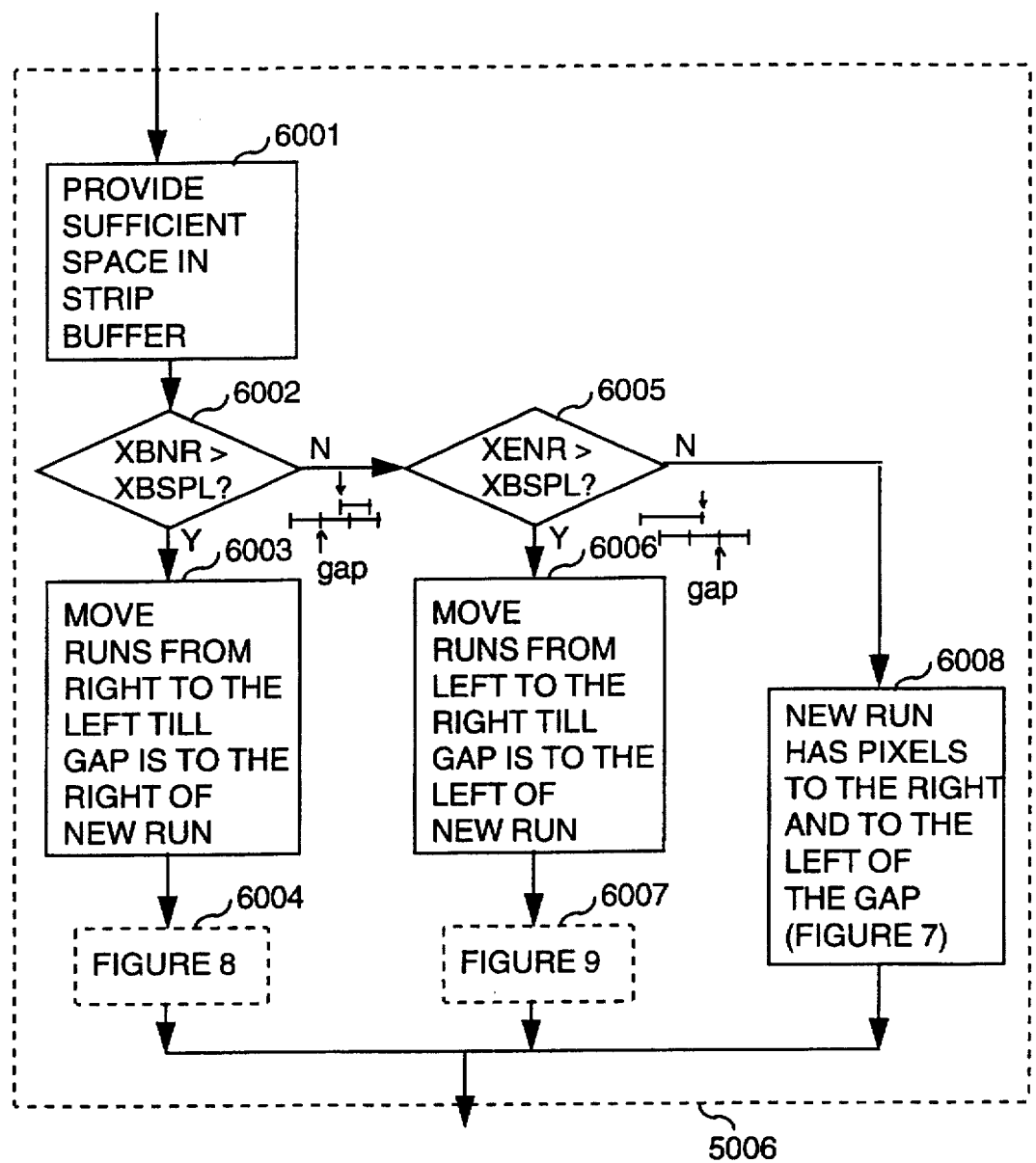

However if, in step 5001, the strip buffer appears to be of the type FULL-COLOR, a more extensive method 5006 such as described in FIG. 6 follows.

FIG. 6 illustrates the method for inserting a new runlength NRL in a single strip buffer of the FULL-COLOR type. First, in step 6001, it is determined whether sufficient space is available in the strip buffer in order to be able to insert the new runlength. This is realized by allocating new memory space, copying the stored runlengths to this new memory space and deallocating the old memory space. Further the BLEN information in the information word is adapted. In step 6002 it is established if the pixel coordinate XBNR (in the image line direction) at the beginning of a new runlength is larger than the pixel coordinate XBSPL (in the image line direction) of the gap. If this is the case, then the new runlength does have pixels to the right of the gap, and so one or more runlengths in the strip buffer are moved, in step 6003, from the right to the left of the gap such that the gap will be situated to the right of the beginning of the new runlength NRL. Subsequently, in step 6004, the new runlength is inserted.

If the determination in step 6002 appears to be negative, then, in step 6005, it is checked if the pixel coordinate XENR at the end of the new runlength is smaller than the pixel coordinate XBSPL of the gap. If this is the case, then the new runlength does have pixels to the left of the gap, and so one or more runlengths in the strip buffer are moved (in step 6006) from the left to the right of the gap such that the gap is situated to the left of the new runlength. Subsequently, in step 6007, the new runlength is inserted.

If the determination in step 6005 also appears to be negative, then the new runlength does have pixels to the left as well to the right of the gap. In step 6008, the new runlength is inserted.

Figure 7:
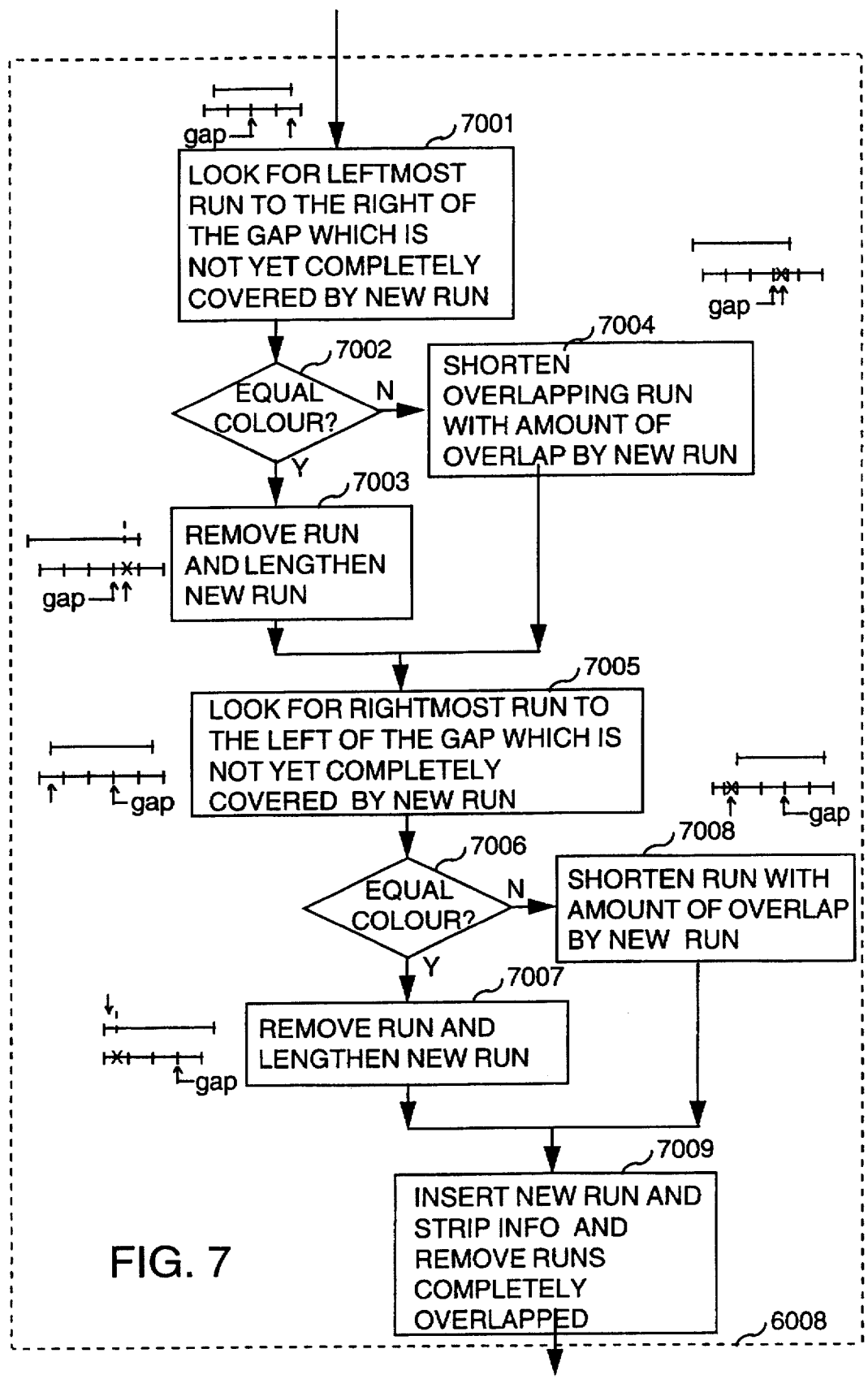

In FIG. 7, the step 6008 of FIG. 6 for inserting a runlength which has pixels to the right as well as to left of the gap, is illustrated. First, in step 7001, the leftmost runlength to the right of the gap, which is not yet covered completely by the new runlength, is searched. Subsequently it is determined, in step 7002, whether this runlength does have the same color as the new runlength. In the case of identical colors, this runlength is, in step 7003, removed and the new runlength is lengthened with the part not covered or overlapped by this runlength. In the case of different colors, the runlength of the covered or overlapped runlength is, in step 7004, shortened with an amount which is covered by the new runlength.

Subsequently, in step 7005, the rightmost runlength to the left of the gap, which is not yet completely covered by the new runlength, is searched. As described before, if this runlength possesses the same color as the new runlength, then the runlength is either substituted or shortened and the new runlength is lengthened if necessary (steps 7006, 70007 and 7008). Further, the completely covered runlengths are removed.

Finally, in step 7009, the new runlength, which may have been lengthened, is inserted and the information in the information word is modified.

Figure 8:
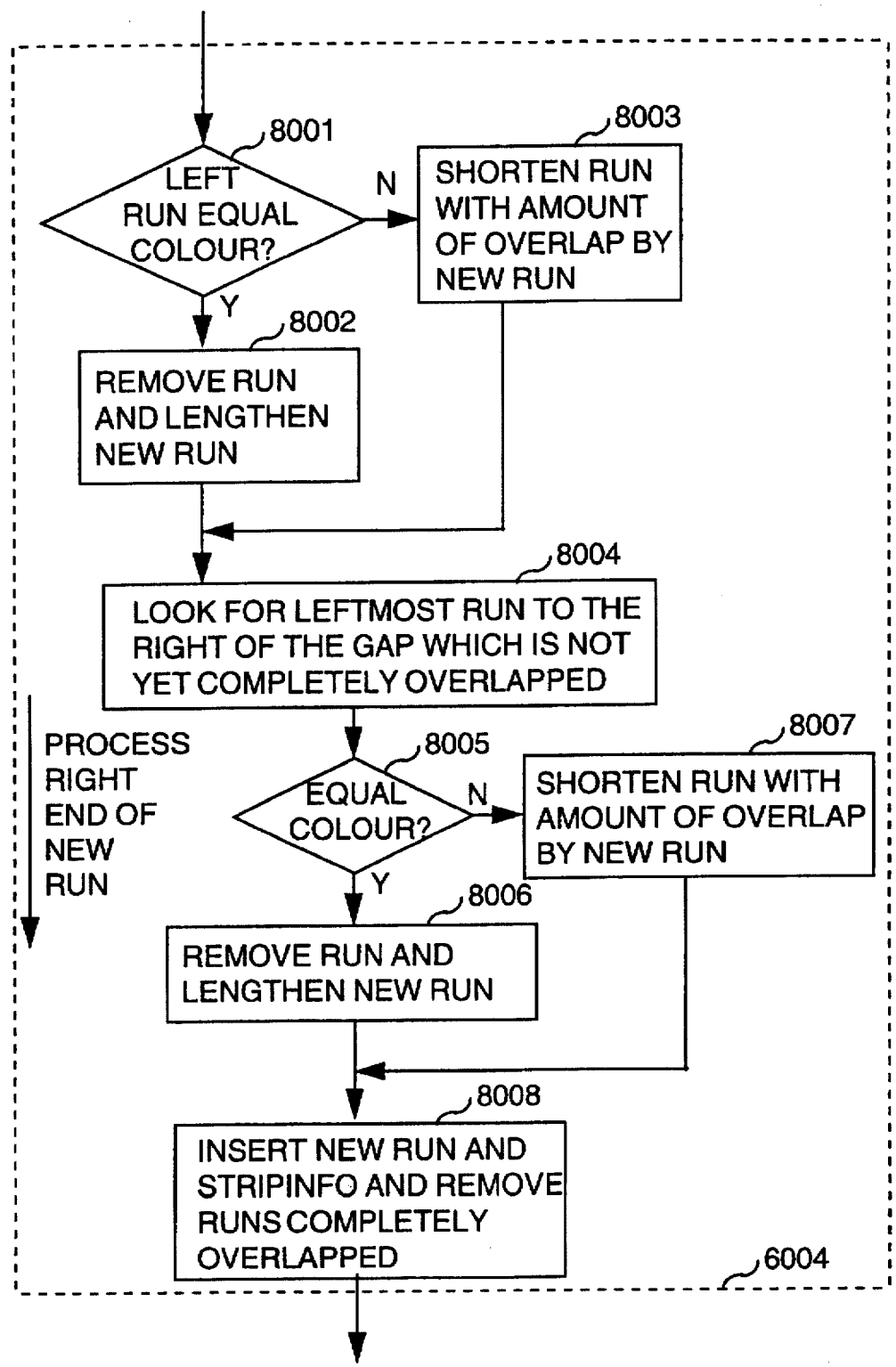

In FIG. 8, step 6004 of FIG. 6 is illustrated for inserting the new runlength if the runlength only has pixels to the right of the gap. It is remarked that, according to the method illustrated in FIG. 6, the gap has moved meanwhile such that the gap is situated now to the right of the beginning of the new runlength.

In step 8001, it is determined if the runlength just to the left of the gap has the same color as the new runlength. If this is the case, then this runlength is removed and the new runlength is lengthened (step 8002). Otherwise this runlength is shortened with the amount of overlap by the new runlength (step 8003).

Subsequently, the right end of the new runlength is processed. Hereto is looked for, in step 8003, the leftmost runlength to the right of the gap which is not yet completely covered by the new runlength. This runlength is subsequently either removed and the new runlength lengthened or this runlength is shortened with the amount of overlap by the new runlength (step 8005, 8006 and 8007). Again, the completely overlapped runlengths are removed.

Finally, in step 8008, the new runlength is inserted and the information in the information word corresponding with the strip buffer is modified.

Figure 9:
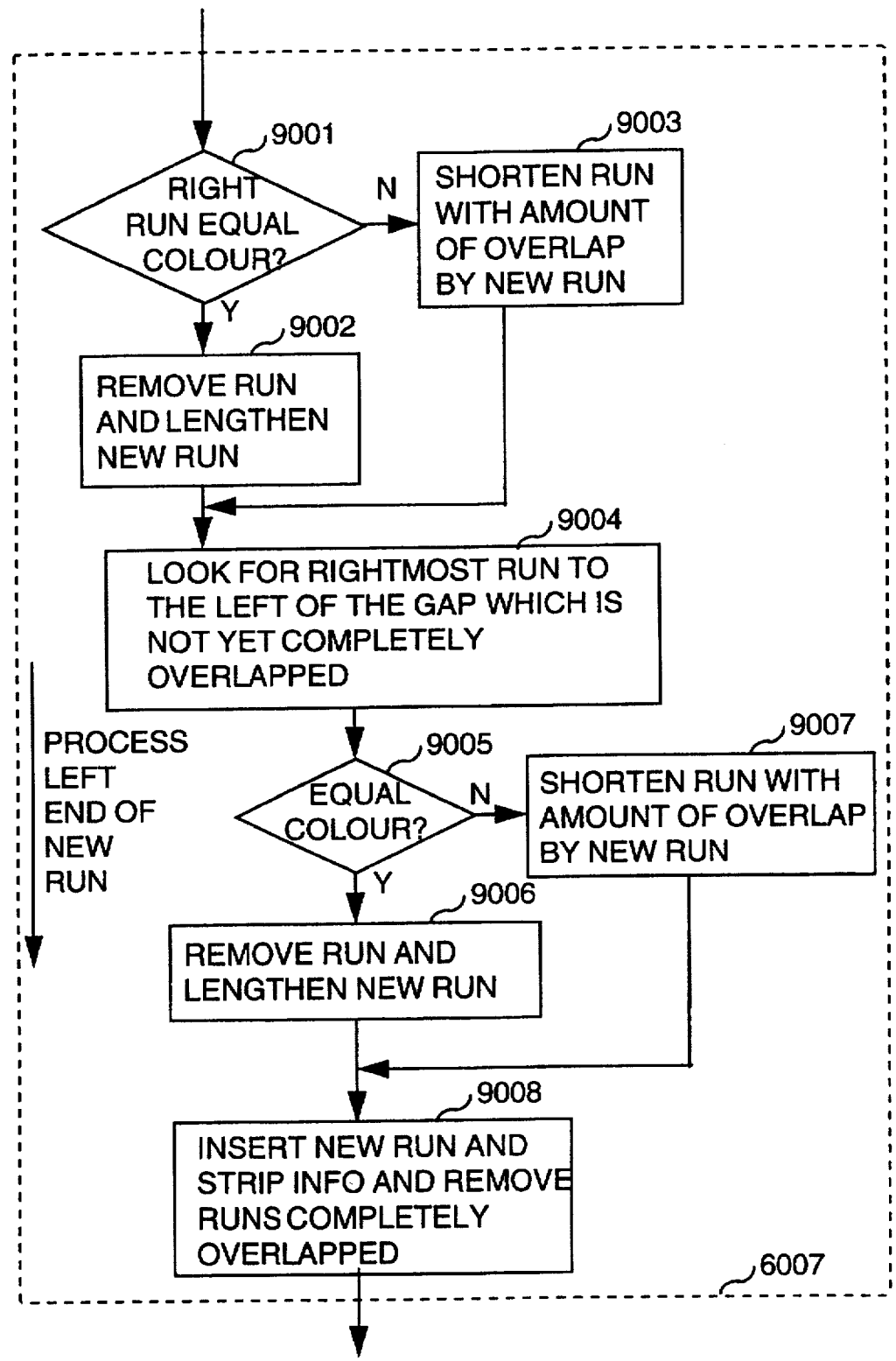

FIG. 9 illustrates a method analogous to that illustrated in FIG. 8 but for the case in which the new runlength only has pixels to the left of the gap. Again, according to the method in FIG. 6, the gap is moved such that the gap is situated just to the left of the beginning of the new runlength.

In step 9001, it is determined if the runlength just to the right of the gap has the same color as the new runlength. If this is the case, then, in step 9002, the runlength is removed and the new runlength is lengthened with the amount of the not-overlapped part of the removed runlength. Otherwise, in step 9003, the runlength is shortened with the amount of overlap by the new runlength.

Subsequently, the left end of the new runlength is processed. In step 9004, it is determined whether the rightmost run to the left of the gap is not yet completely overlapped by the new runlength. If this runlength has the same color (step 9005), then the runlength is removed and the new runlength lengthened (step 9006), otherwise the runlength is shortened (step 9007). Finally, in step 9007, the new runlength is inserted and the information in the information word corresponding with the strip buffer is modified. The completely overlapped runlengths are also removed.

The situations described thus far are related to the case that the new runlength covers a maximum of one strip. This is determined in step 4003 of FIG. 4. Distinction is then made between situations where the new runlength does have pixels either to the left, to the right or as well to the left and to the right of the gap. The processing of the different situations is described in the FIGS. 7, 8 and 9. In the FIGS. 10, 11 and 12 the processing is described in the situation where the new runlength covers more then one strip.

FIG. 10 describes the modifying of the leftmost strip which is partially covered by the new runlength in the case that the new runlength covers several strips. When this partially covered strip is of the MONO-COLOR type and has the same color (step 10001 and 10002), then the processing is finished and nothing needs to be modified. If a MONO-COLOR strip to has a different color then the new runlength (step 10003), then the strip is changed into a FULL-COLOR strip. In steps 10004, 10005 and 10006, it is determined if the strip buffers needs to be extended. This is done by determining successively if there is enough space (the gap) available (step 10004), if the beginning of the last runlength is situated to the left of the leftmost pixels to be colored (step 10005) and if the color of the last runlength is different from the color of the new runlength (step 1006). If the outcome of these three conditions is positive, then, in step 10007, a new strip buffer with a double size is allocated and the runlengths in the old strip buffer are copied to the new strip buffer. The copied runlengths are situated then to the left of the gap. Subsequently, the new runlength is inserted, in step 10008, to the right of the gap.

However, if enough space is available in the strip buffer, then, in step 10009, it is determined if the gap is situated to the left of the leftmost pixels to be colored. If this is the case, then, in step 10010, the runlengths are moved from the left to the right of the gap until a runlength is obtained which is not yet completely covered by the new runlength. In the other case, in step 10011, as much runlengths are searched from right to the left of the gap until a runlength is found which is not yet completely covered by the new runlength. Subsequently, in step 10012, it is determined if this not completely covered runlength has the same color. If this is the case, then, in step 10013, the runlength is removed and the new runlength is lengthened. In the other case, in step 10014, the runlength is shortened with the amount overlap by the new runlength. Finally, in step 10015, it is determined if the strip has to become a MONO-COLOR strip. Either the strip is, in step 10016, changed into a MONO-COLOR strip or, in step 10017, the new runlength is inserted in the strip buffer and the information in the corresponding information word is changed.

Figure 11:
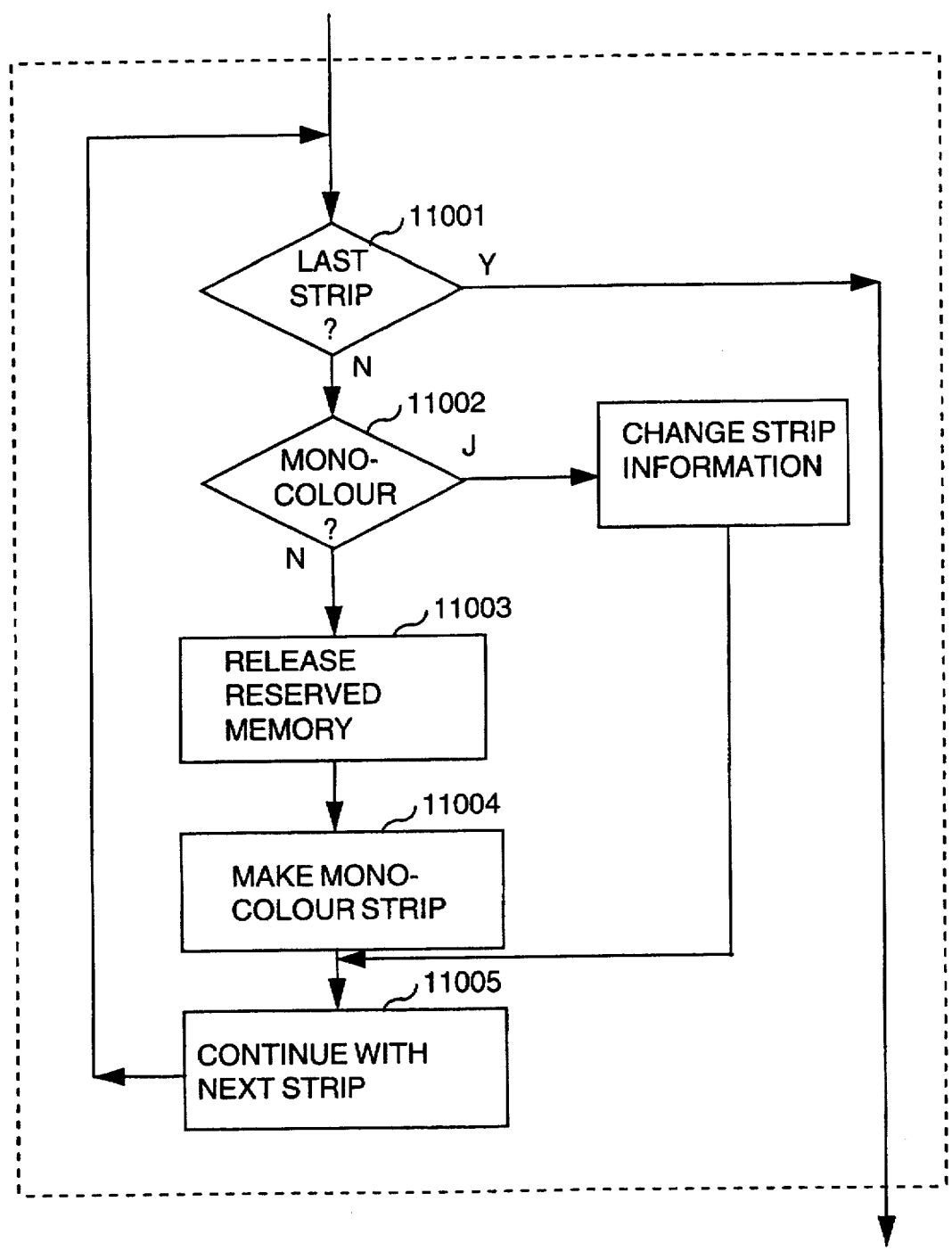

FIG. 11 illustrates the modifying of strips which are completely covered by the new runlength where the new runlength covers several strips. This is realized by repeatedly (step 11001 and step 11005) performing the following steps for each completely covered strip. In step 11002, it is determined whether the completely covered strip is of the type MONO-COLOR. If this is the case, then, in step 11006, the information in the corresponding information word is possibly modified in accordance with the color of the new runlength. If the strip is not of the type MONO-COLOR, then, in step 11003, the corresponding memory in the strip buffer is deallocated. Subsequently, in step 11004, the strip is changed into the MONO-COLOR type with the color of the new runlength by modifying the corresponding information in the information word.

Figure 12A:
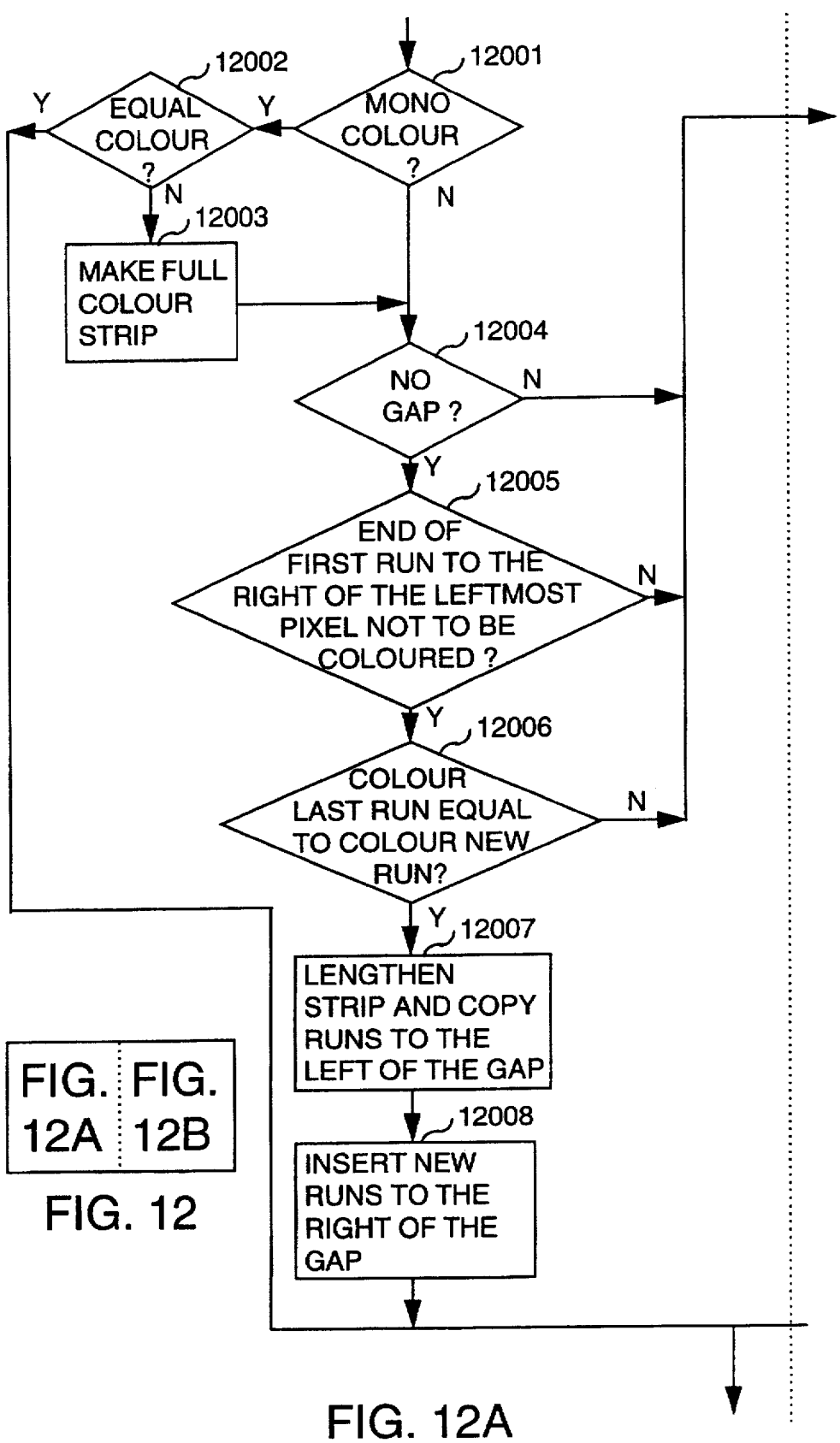
FIGS. 12A and 12B, illustrates the method for inserting a long runlength in strip buffers to be filled completely.
Figure 12B:
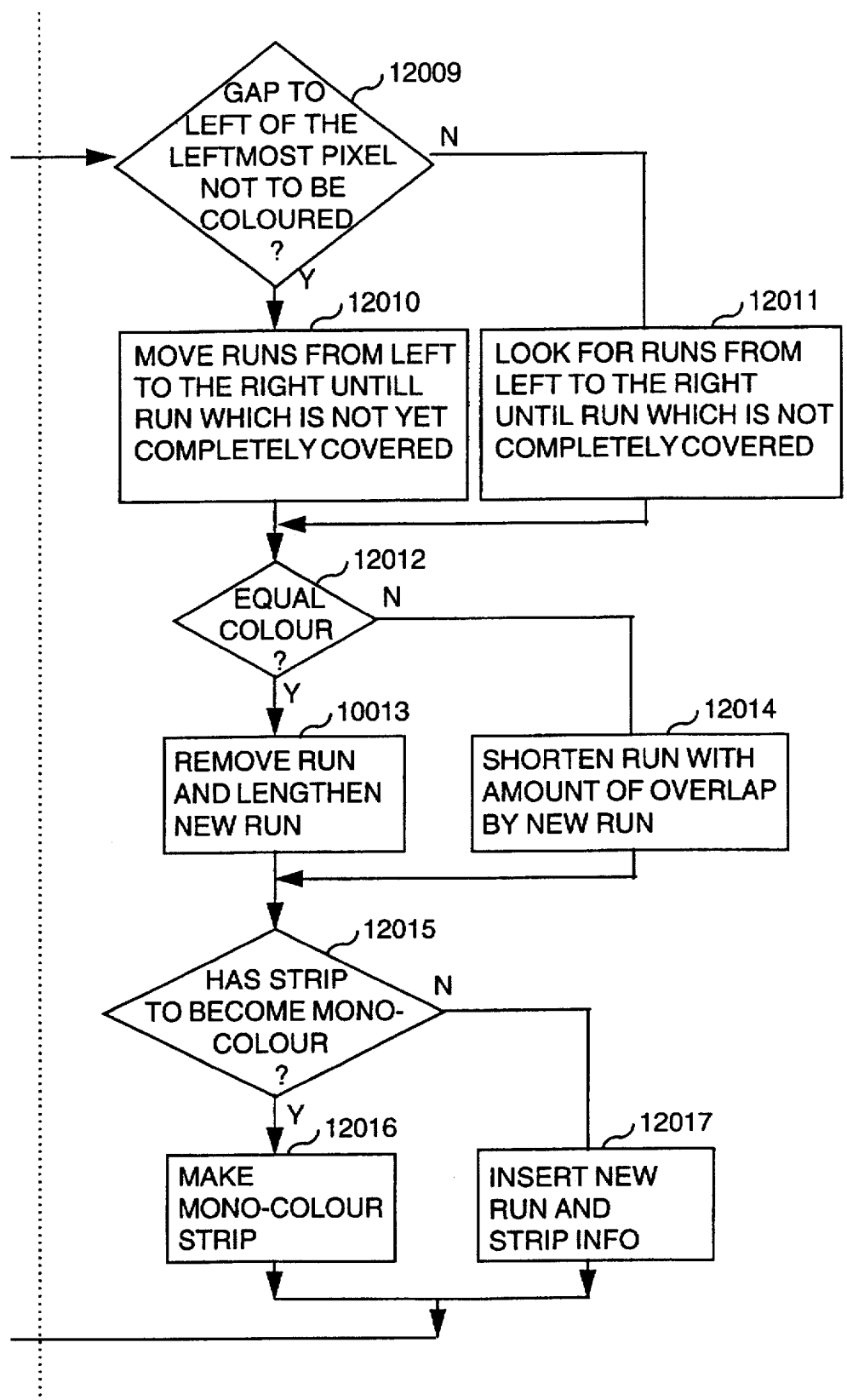

FIG. 12 describes the modifying of the rightmost strip which is partially covered by the new runlength in the case the new runlength covers several strips. When this partially covered strip is of the MONO-COLOR type and besides has the same color (step 12001 and 12002), then the processing is finished and nothing needs to be modified. If a MONO-COLOR strip to has a different color then the new runlength (step 12003), then the strip is changed into a FULL-COLOR strip. In steps 12004, 12005 and 12006, it is determined if the strip buffers need to be extended. This is done by determining successively if there is enough space (the gap) available (step 12004), if the end of the first runlength is situated to the right of the leftmost pixels not to be colored (step 12005) and if the color of the last runlength is different from the color of the new runlength (step 12006). If the outcome of these three conditions is positive, then, in step 12007, a new strip buffer with a double size is allocated and the runlengths in the old strip buffer are copied to the new strip buffer. The copied runlengths are situated then to the right of the gap. Subsequently, the new runlength is inserted, in step 12008, to the left of the gap.

However, if enough space is available in the strip buffer, then, in step 12009, it is determined if the gap is situated to the left of the leftmost pixels not to be colored. If this is the case, then, in step 12010, runlengths are moved from the left to the right of the gap until a runlength is obtained which is not yet completely covered by the new runlength. In the other case, in step 12011, runlengths are searched from left to the right of the gap until a runlength is found which is not yet completely covered by the new runlength. Subsequently, in step 12012, it is determined if this not-completely-covered runlength has the same color if this is the case, then, in step 12013, the runlength is removed and the new runlength is lengthened. In the other case, in step 12014, the runlength is shortened with the amount of overlap by the new runlength. Finally, in step 12015, it is determined if the strip has to become a MONO-COLOR strip. Then, either the strip is, in step 12016, changed into a MONO-COLOR strip or, in step 12017, the new runlength is inserted in the strip buffer and the information in the corresponding information word is changed.

The method described above can be executed by either a general processor which is provided thereto with a dedicated program or either by special developed circuitry. This circuitry can be either be of a fixed design or either be programmable such as for example Logic Cell Arrays. The choice between available means for executing the described method shall be in each case be made by the man skilled in the art and be based upon considerations related to processing speed, flexibility, costs and so on.

Figure 13:
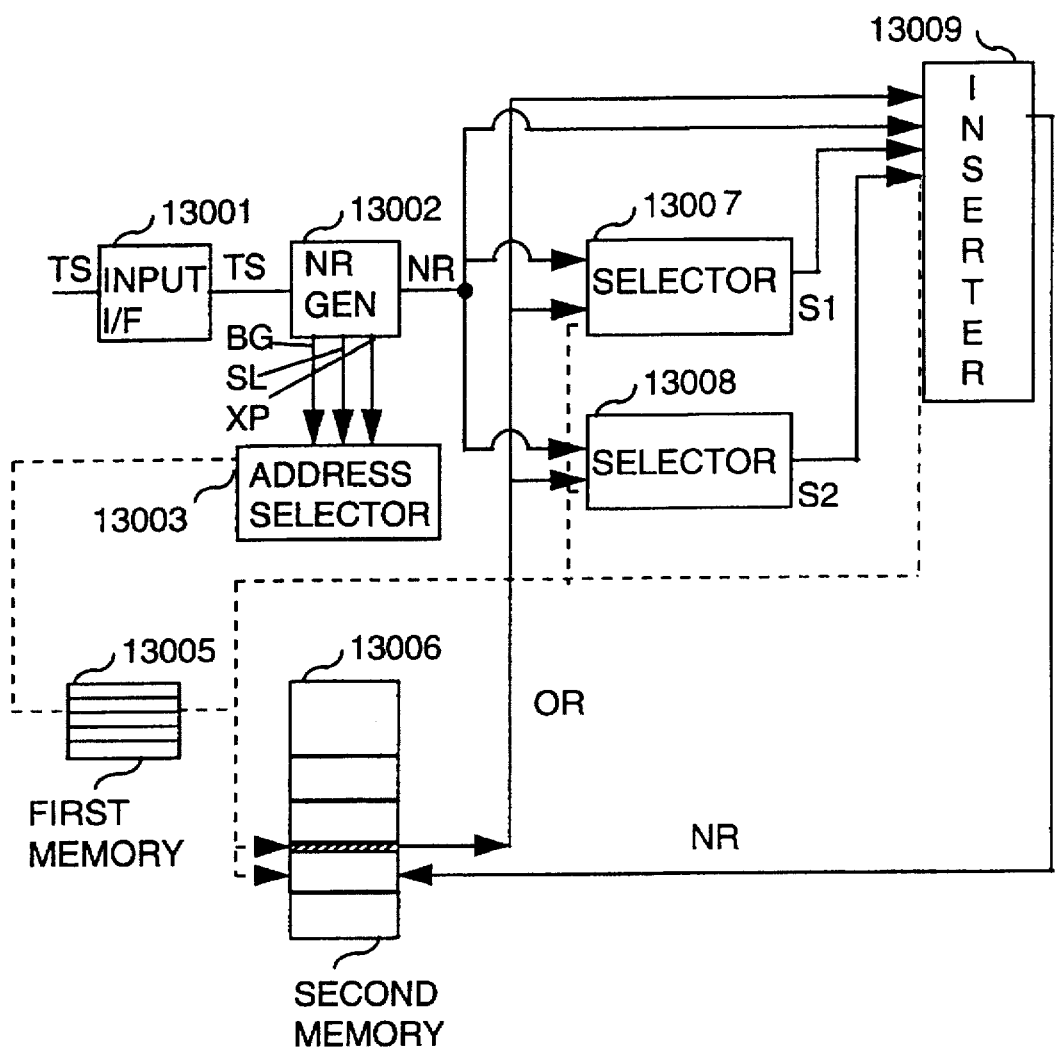
FIG. 13 illustrates schematically an apparatus for performing the method according to the invention.

An apparatus for executing the method described according the invention is shown schematically in FIG. 13.

In FIG. 13 input means 13001 are depicted for receiving the drawing signals TS. These drawing signals TS are subsequently fed to runlength generation means 13002. This runlength generation means 13002 generate on the basis of a supplied drawing signal TS, one or more new runlength signals NR. Next to this, address information signals corresponding to this runlength signal NR are generated on behalf of address selection means 13003. These address information signals comprise an image area signal BG for selection of a strip buffer which corresponds with this image area, an image line signal SL and a pixel signal XP for the pixel positions covered by the runlength signal NR. The address information generated by the address selection means 13003 are fed to the first memory means 13005. These memory means 13005 allocate subsequently a corresponding memory area in the second memory means 13006. The memory in the memory means 13006 is further divided into strip buffers.

The new runlength signal NR generated by the runlength generation means 13002, is fed to the first and second selection means 13007 and 13008, together with the relevant runlength signals OR which are stored in the second memory means. The first selection means 13007 determine whether the pixel positions of the new runlength signal correspond with the pixel positions of the relevant, stored runlength signals OR. Hereto the address information of the first memory means is fed also to these selection means. The second selection means 13008 determine whether the pixel value signal corresponding to the new runlength signal NR differs form the pixel value signal corresponding to an overlapping runlength signal. The resulting selection signals S1 and S2 are fed to runlength insertion means 13009, together with the runlength signals NR and OR. These means 13009 modify the runlength signals stored in the second memory means and insert the new runlength signal according to the method as illustrated in the previous figures.

Figure 14:
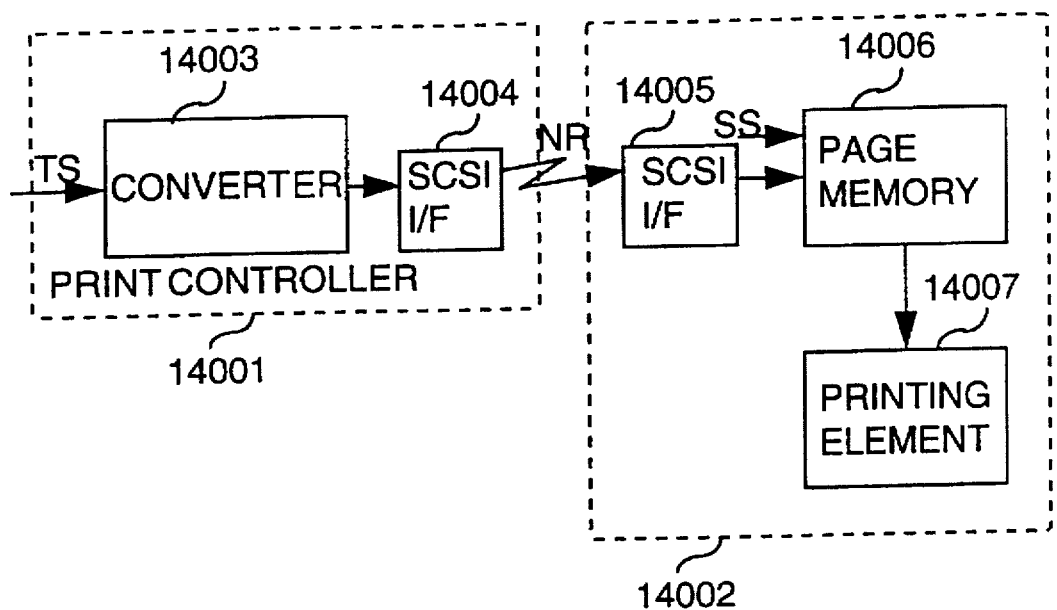
FIG. 14 illustrates a printing system with an apparatus according to FIG. 13.

Finally, in FIG. 14, an image reproduction system is depicted for reproducing an image at an image bearing member. This system comprises a printer 14002 controlled by a printer controller 14001. The printer comprises reproduction means 14007 based on, for example, a laser or LED with a photo-conductive member or an inkjet. Further, the printer 14002 comprises a page memory 14006 suitable for storage of image signals to be reproduced. In the case of an open digital copying apparatus, this memory 14006 receives scan signals SS from an image scanner not depicted in the figure. In case of controlling by the printer controller 14001, the memory 14006 is filled by data transmission means 14004 and 14005 with image signals. These data transmission means preferably comprise a standardized electrical connection according to the SCSI-standard, for example. The printer controller 14001 comprises further an apparatus 14003 according FIG. 13 for converting drawing signals TS to be fed to the printer controller 14001 to runlength signals NR to be fed to the printer 14002. It is significant that the memory space required in the printer controller 14001 and the capacity required for transport of the signals to the printer 14002 is smaller than in the case of converting the runlength signals first to bitmap signals.

The embodiments described make use of an one-dimensional runlength compression in one direction (being their image line direction). However, two-dimensional compression in two directions is equally possible. By allocating per strip buffer a reference code, administration of two image areas or strips resulting from two different image lines having the same color is available.

Further, in stead of a FULL-COLOR strip a BI-COLOR strip can be kept where information regarding two colors can be stored. In this case, only a runlength without pixel values is stored in the strip buffer. A first runlength has always the first color while successive runlengths always have a color which alternates between the first and the second color. Use is needed of only one byte instead of four bytes per runlength. The pixel values of the two colors can be stored in the information word corresponding with the strip buffer.

I claim:

1. Method for converting a series of drawing instructions, suitable for assigning pixel values corresponding to said drawing instructions to an image arranged in rows and columns of pixels, to a series of runlengths and corresponding pixel values so that a runlength represents the number of successive pixels with mutual identical pixel values and so that the series of runlengths and pixel values are arranged according to a first order as determined by successive pixel positions, the method comprising the steps of:

determining the runlengths of the pixel values as generated by the drawing instructions in a second order which is different from the first order;

determining the insert positions of said determined runlengths in the series of runlengths on the basis of pixel positions of said determined runlengths; and inserting said determined runlengths in the series of runlengths so that runlengths of the series which have positions in common with the runlengths to be inserted are modified in dependance on the runlengths and pixel values to be inserted.

2. Method according to claim 1, wherein said step of inserting comprises:

removing runlengths from the series which are overlapped completely by the runlength to be inserted with respect to pixel position, shortening runlengths from the series which are overlapped partially by the runlength to be inserted with respect to pixel position and which have different pixel values with a length equal to the part overlapped, lengthening the runlength to be inserted in case of runlengths of the series which are overlapped partially by the runlength to be inserted with respect to pixel position and which have an identical pixel value with this with a length equal to the part not being overlapped followed by removing said runlength for the series, inserting the runlength to be inserted into the series of runlengths.

3. Method according to claim 1, further comprising:

dividing the image in subareas of pixels, dividing the series of runlengths and pixel values in subseries so that each subseries corresponds with a subarea of the image, and further inserting the runlengths and pixel values into the subseries which correspond to the subareas of said runlengths.

4. Method according to claim 3, further comprising:

storing the subseries in an addressable memory, assigning an information word to each subarea, and adding address information to the information word concerning the address of the corresponding subseries in the memory.

5. Method according to claim 4, further comprising:

initially making available a minimal amount of memory space in the addressable memory for each subseries, further determining if there is sufficient memory space available for each runlength and pixel value to be inserted for the corresponding subseries, enlarging the memory space available for the subseries if said minimal amount is not sufficient, and adapting the address information in the corresponding information word.

6. Method according to claim 4, further comprising:

adding type information to the information word for indicating the type of image information which is being represented by the corresponding subseries.

7. Method according to claim 4, further comprising:

splitting a subseries up into two parts such that the available space in the memory for a subseries is positioned between the spaces occupied by the two parts and such that the runlength and pixel value inserted latest occupies the space adjacent to the available space, moving through the runlengths from this available space when searching for a runlength in the subseries, and moving, after inserting a runlength to the subseries, the runlengths until the inserted runlength is adjacent to the available space.

8. Apparatus for converting image representation formats, the apparatus comprising:

input means for receiving drawing signals corresponding to which are to be generated pixel value signals of an image arranged in columns and rows of pixels;

runlength generation means for generating runlength signals in accordance with said drawing signals such that a runlength signal represents the number of successive pixels with identical pixel value signals;

memory means for storing the runlength signals and corresponding pixel value signals generated by the runlength generation means, such that the runlength signals are readable from the memory means in a first order as determined by successive pixels positions; and runlength inserting means for storing the generated runlength signals into the memory means in a second order which is different from the first order and for modifying runlength signals already stored into the memory means and which have coinciding pixel positions with said generated runlength signals in dependance on the generated runlength signals and pixel value signals.

9. Apparatus according to claim 8, wherein the runlength inserting means comprise:

selection means for selecting a first and one of a second and third runlength signals which are to be stored in the memory means, a part of the pixel positions of said first, second and third runlength signals, respectively, coinciding with pixel positions of a generated runlength signal where the pixel value signals corresponding with one of the second and third runlength signals are not identical, respectively, to the corresponding pixel value signal of the generated runlength signal, and modification means for removing from the memory means the first runlength signals, for limiting the pixel positions covered by the second runlength signals to pixel positions which are covered by the generated runlength signal, for extending the generated runlength signal to pixel positions which are covered by a third runlength signal, for removing from the memory means the third runlength signals, and for storing into the memory means the generated runlength signal.

10. Apparatus according to claim 8, wherein:

the memory means is divided into several memory areas so that the memory areas correspond with subareas of an image, and the runlength inserting means also is for storing runlength signals and pixel value signals in memory areas which correspond with subareas of an image corresponding to said runlength signals and said pixel value signals.

11. Apparatus according to claim 10, wherein:

the memory means also is for storing an information signal for each subarea of the image, the information signal including an address reference signal for the memory area in the memory means which is available for a subarea.

12. Apparatus according to claim 10, wherein the runlength inserting means comprise:

memory designation means for initially making available for each subarea a minimal amount of memory space in the memory means, and wherein the memory designation means also is for determining if sufficient memory space is available for a generated runlength signal and further for enlarging the designated memory space if there is not enough memory space available and for modifying the address reference signal in the information signal of the corresponding subarea.

13. Apparatus according to claim 11, wherein:

the memory means also is for storing a type signal for each subarea of the image, the type signal including the type of image information which is represented by the stored runlength signals of the corresponding subarea.

14. Apparatus according to claim 11, wherein:

the part of each memory area which is occupied by runlength signals, is split into two memory subareas such that the space in the memory area available for runlength signals is positioned between the two spaces occupied by the two memory subareas, the runlength signal stored latest occupies the space adjacent the available space, and the runlength selection means also is for examining the stored runlength signals from the available space when selecting runlength signals and, after storing a generated runlength signal, for moving the stored runlength signals in the memory space until the stored generated runlength signal is adjacent to the available space.

15. Image reproduction system for reproducing an image on an image bearing member, the system comprising:

a digital printer provided with an image memory for reproducing an image stored in the image memory, data transmission means for transmitting data signals generated by a printer controller device to the image memory of the printer, and said printer controller device for receiving page description signals, said printer controller device including an apparatus as claimed in one of the claims 8–14 wherein the page description signals correspond with the drawing signals and the generated data signals correspond with the runlength signals and pixel value signals.

* * * * *